United States Patent [19]

Raether

[11] Patent Number: 4,913,716

[45] Date of Patent: Apr. 3, 1990

[54] PLUNGER CHANGE APPARATUS AND METHOD

[75] Inventor: Scott E. Raether, Dublin, Ohio

[73] Assignee: Oi-Neg TV Products, Inc., Toledo, Ohio

[21] Appl. No.: 344,795

[22] Filed: Apr. 28, 1989

[51] Int. Cl.⁴ .................... C03B 11/02; C03B 11/06
[52] U.S. Cl. ........................................ 65/27; 65/172; 65/308
[58] Field of Search .................. 65/27, 68, 172, 305, 65/308, 319, 171, 173

[56] References Cited

U.S. PATENT DOCUMENTS

| | | | |
|---|---|---|---|
| 1,931,375 | 10/1933 | Cook et al. | 65/172 |
| 3,573,025 | 3/1971 | Hamilton | 65/172 |
| 3,595,637 | 7/1971 | Eldred et al. | 65/172 |

Primary Examiner—Joye L. Woodard

[57] ABSTRACT

A glass face plate press is provided with a semi-automatic, plunger changing apparatus. The changing apparatus takes the form of a movable plunger supporting head and carriage that is mounted adjacent the press station for movement into and out of position to insert a new plunger on the plunger clamping mechanism of the press. The press has a receiving box into which a plunger support plate is inserted prior to clamping and locking of the plate and supported plunger to the press.

11 Claims, 8 Drawing Sheets

PLUNGER CHANGE APPARATUS AND METHOD

This invention relates to apparatus for changing plungers on a TV face plate press wherein the change equipment is semi-automatic in that it will support a replacement plunger while receiving the worn plunger from the press, then move the replacement plunger into position to be mounted in the press.

BACKGROUND OF THE INVENTION

It has been the practice in the past to stop the press for at least ten minutes while physically changing the plunger. This would involve the positioning of hoist equipment into proximity to the press where there is considerable heat present. The workers would have to release the old plunger while supporting with the hoist. Cooling water inlet and outlet lines to the plunger would have to be disconnected and the plunger moved away from the area. The new plunger would then be brought in on a hoist and attached to the plunger assembly and the cooling water inlet and outlet lines would be reconnected. This was a time consuming operation and after the replacement had been made, it would take at least 20 more minutes for the molds to become reheated, with gobs of molten glass, to the required temperature to begin producing acceptable face plates or glass parts.

When considering that these plungers are around 700 pounds, it can be seen that it is a major interruption of the forming process when it is necessary to change the plunger. The one-half hour loss of production is costly, as well as the necessity of restarting a glass forming system that requires being brought back into thermal equilibrium after the interruption.

In view of the foregoing, it is an object of the present invention to provide a system that will remove an old plunger and replace it with a new plunger without requiring an operator to actually approach the machine any closer than five feet.

It is a further object of the invention to provide a plunger handler that will support a new plunger and receive an old plunger as it is released from the press and then reverse the positions of the old and new plunger to permit the accurate replacing of the new plunger in the plunger holder of the press without stopping the movement of the mold supporting table so that those articles that have been previously pressed may continue through their cycle of cooling while the plunger is being replaced.

It is a further object of the invention to provide a plunger holder and clamping mechanism that will release a plunger to a plunger change support holder that will not disturb the continuation of the machine and permit the insertion of a new plunger in the precise position where the cooling water system will be reconnected without requiring any further manipulation and only require the shutting off of the water supply during the actual replacement of the plunger.

It is a still further object of the invention to provide plunger change equipment that is retracted out of the way during normal operation of the press and then be moved into position and loaded with a new plunger to be inserted in a plunger holder after the old plunger is received and supported by change equipment with the water shut-off, gob feeding diversion and change equipment movement under the control of a series of switches and motors which control the entire sequence of operation of the plunger exchange with only a minimum of operator intervention.

Other objects and advantages will be apparent from the following description taken in conjunction with the annexed sheets of drawings.

DETAILED DESCRIPTION OF THE DRAWINGS

Figure 1:
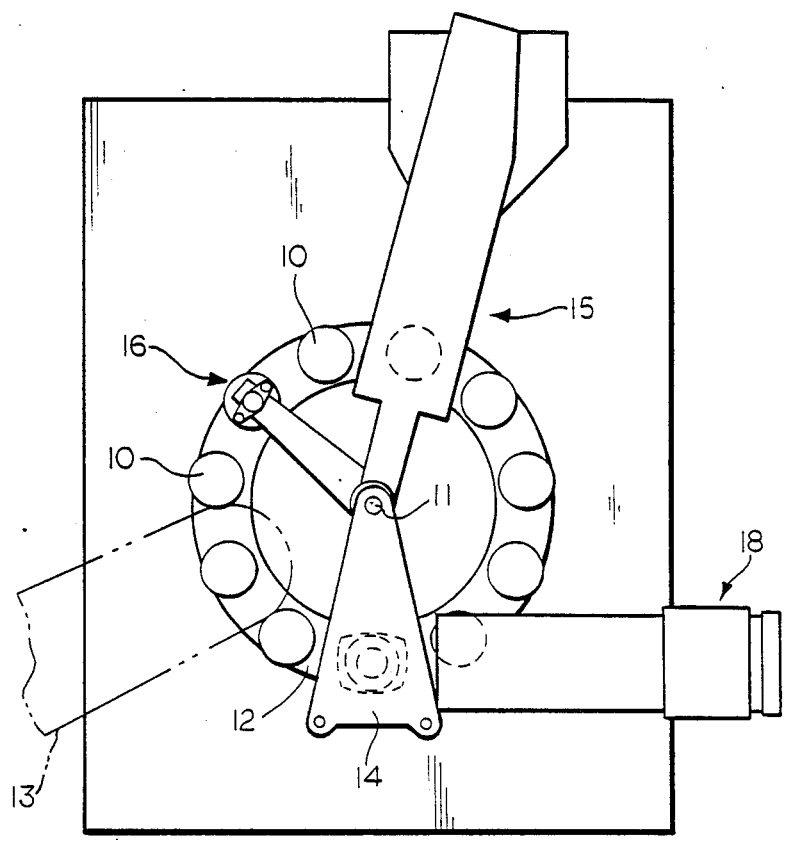
FIG. 1 is a schematic plan view of a TV face plate press mechanism with the plunger changer of the invention shown in conjunction therewith.

With particular reference to FIG. 1, there is shown, schematically, a plan view of a television face plate press of the indexed mold type where a series of mold supports 10 are positioned in a circle about a vertical axis 11 of mold supporting table 12.

Positioned above the table 12 in alignment with a mold is the outlet of a forehearth 13 (in phantom line) from which a gob or charge of molten glass is issued, to fall by gravity into the mold therebeneath. Once the mold has become charged, the mold table will be indexed to bring the mold into position beneath a press station or plunger pressing position, designated 14, where the charge is pressed into the final shape of a TV face plate by movement of the plunger vertically downward into the mold. After the pressing has been completed, the table 12 is indexed through a series of cooling stations where the glass in the mold is subject to "wind headers" for controlled cooling of the glass. The cooled glass will be brought into a "takeout" station 15 where the glass is removed from the mold. The molds are indexed further past an additional cooling station 16 where the molds are also cooled prior to their arrival back to the charging station beneath the forehearth.

It is understood that the indexing of the table 12 is actually through an angle of about 32.727° which encompasses two adjacent mold positions, so that the mold that receives a charge is moved into the press station 14 at the first indexing of the table. Thus there are an odd number of molds.

It is at the press station 14 that the plunger change equipment 18 of the invention is located.

With particular reference to FIGS. 2-6, the details of the semi-automatic plunger change equipment 18 will be described. The press at station 14 rests on the floor or a fixed surface and a base 19 for the change equipment 18 rests on the floor and is fixed to the side of the machine base at 20, either by welding (as shown) or being bolted thereto. The base 19 and the equipment it supports is portable in the sense that it is provided with rollers or casters 21 at its end which is remote from the press station. Thus the change unit 18 can be moved with the machine as needed. The entire face plate forming machine is movable relative to the forehearth and the rollers 21 make the change unit 18 movable therewith. It is intended that the change unit 18 stay with the face plate forming machine although it could be moved to another machine if desired. Extending vertically upward from the base 19 are a pair of support legs 22 which are braced at their lower ends by welded triangular plates 23 and pairs of anchor plates 24. A horizontal cross member 25 extends over and between the upper ends of the legs 22. The upper surface of the cross member or beam 25 supports a pair of spaced-apart clamp blocks 26. Each of the clamps 26 holds one end of parallel horizontal rods 27 and 28. The opposite ends of the rods 27 and 28 are supported from the side of the vertical side frame of the press station 14 by clamp members 29. Thus both ends of the rods 27 and 28 are anchored relative to the press 14.

Supported from the rods 27 and 28 is a carriage, generally designated 30. The carriage 30 has two pairs of roller bearings 31 which are carried by the rods 27 and 28, and a generally horizontal platform 32 is supported by the four roller bearings 31. Extending vertically upward from each bearing 31 is a vertical rod 33. The upper ends of the four rods 33 support the corners of a horizontal plate or platform 34 in vertical, spaced alignment with the platform 32. The upper surface of the plate 34 has a worm gear 35 positioned centrally thereof. The gear 35 is a rotary worm drive for raising and lowering a vertical rod 36 that telescopes into a tubular housing 37 which extends above the box 35. The housing 37 is internally threaded at its base area 40 to receive the threaded rod 36. Rotation of the housing 37 by the worm gear 35 is accomplished by an electric motor 38 which is also mounted on the platform. The motor will drive the worm which in turn will rotate the base 40 of the housing 37.

The lower end 39 of the rod 36 is attached to the upper surface of a horizontal box-like frame 41. The four corners of the frame 41 are supported by vertical, cylindrical bearings which surround the guide rods 33. Suspended beneath the frame 41 is a plunger head handler, generally designated 42. The handler 42 is comprised of a pair of criss-cross bracing members 43 and 44 that extend down from the frame 41 and converge at their lower ends to meet with a generally horizontal beam 46. The beam 46 is positioned at a level below that of the rods 27 and 28 but centrally located with respect thereto. The rod 46 carries a pair of fairly substantial support beams 47 and 48 whose upper ends are at the ends of the beam 46 with their lower ends generally converging at a horizontal support plate 49 to which they are attached and the connection is reinforced by angled plates 50 and 51.

The plate 49 serves as the main support member for a plunger receiver 52. The receiver 52 is mounted to the plate 49 by a pair of annular roller bearings 53, 54 (see FIG. 5). A wheel 55 supports the inner race of the bearing 53 and is mounted to the plate 49 by a vertical pin or bolt 56. The pin 56 extends through a support hub 57 that serves as the support for the inner race of the bearing 54. The pin is held and clamped in the opening in the support plate 49 by a pair of threaded lock nuts 58a. The hub 57 and the ring 55 are keyed together against relative rotation and the hub is also clamped to the plate 49 so as not to be rotatable. Only the receiver 52 is free to rotate about the axis of the pin 56.

The receiver 52 supports the outer races of the bearings 53 and 54 at a fairly thick section that surrounds the hub 57 and pin 56. The outer race of the bearing 54 is held in the receiver 52 by a retainer ring 58. A pair of bifurcated arms 59 and 60 extend in 180° opposed directions from the central area of the receiver 52. These arms 59 and 60, in effect, each have a horizontally extending slot which is designed to receive a plunger shaft such as 61 shown in FIGS. 5 and 10. The plunger has a flange 62 that will rest on the top of the receiver arm 60 or 59. The receiver arms 60 and 59 actually have locating pins 63 thereon which will accurately position the plunger axis at a specific location so that the placing of a new plunger on the arm will have its vertical axis at a definite position relative to the carrier. It should be kept in mind that the TV face plate plunger will typically weigh in the range of 750–800 pounds so that when the carriage assembly of the invention is put into operation the receipt of the old plunger and consequent positioning of the new plunger must be with relative accuracy to assure the proper operation of the exchange.

With particular reference to FIGS. 6–10, the mechanism that is carried permanently by the face plate press at the pressing station and the relationship to the plunger will be explained in sufficient detail to explain the handling of the face plate plungers during replacement.

Figure 10:
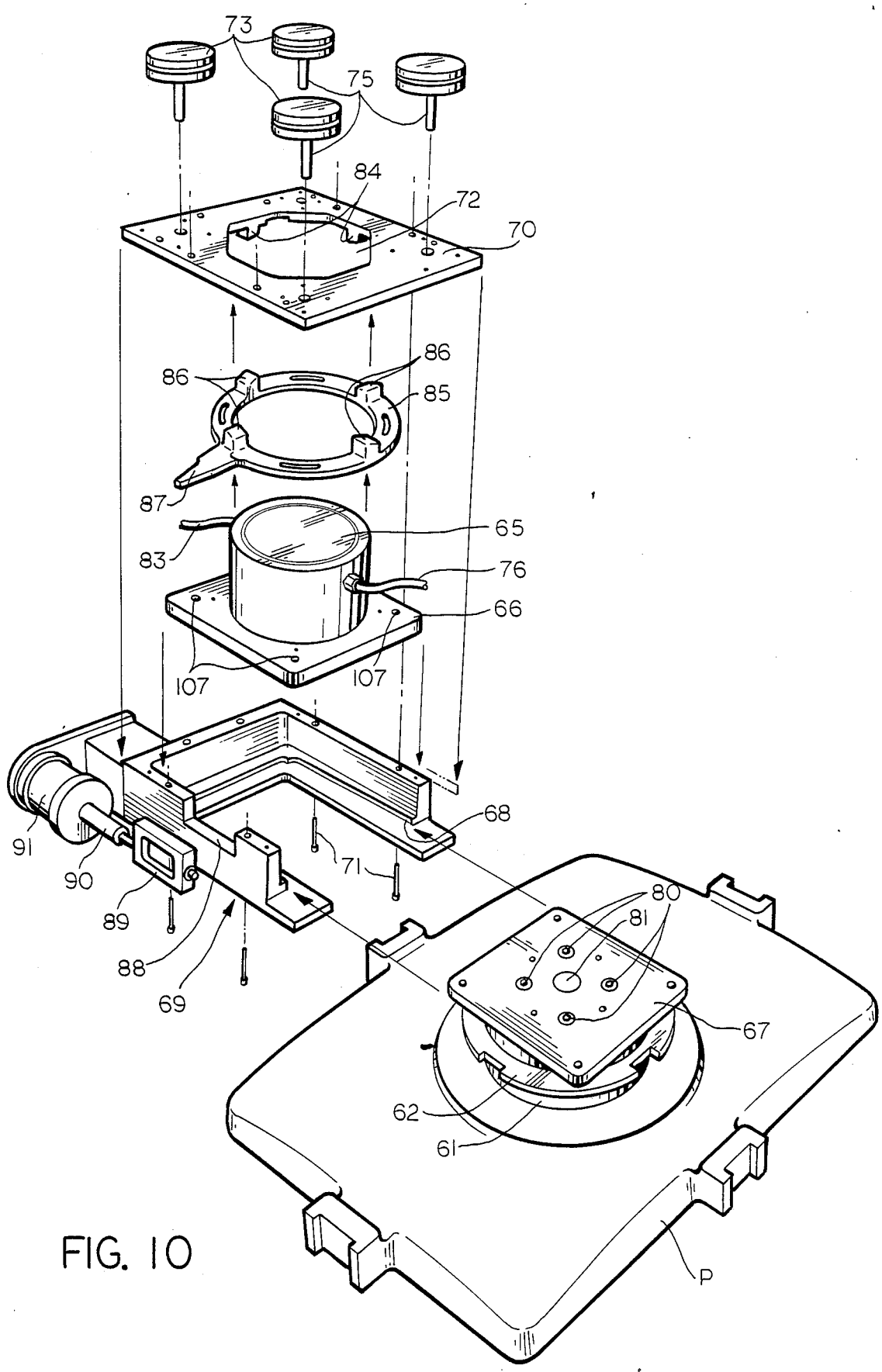
FIG. 10 is an exploded view of the plunger support, latching and clamping system of FIG. 6, shown in conjunction with the top, plunger supporting and clamp plate.

The mechanism shown in full line in FIGS. 6–9 is mounted on the lower end of the face plate press mechanism by the series of bolts 64 (FIGS. 6 and 8) and the plunger is interchangeably attached thereto, as best illustrated in FIG. 10. The bolts 64 attach a cylindrical hub 65 to the main press. The hub 65 has a lower rectangular frame 66 that is adapted to seat against an upper rectangular plate 67 that is attached to the upper end of the plunger shaft 61 (see FIG. 10). The plate 67 is not perfectly square but has a slight taper which cooperates with a tapered receiving slot 68 in a receiving box 69. The box 69 has three sides with an open side through which the plunger plate 67 is introduced. The box 69 is closed at its top by a generally rectangular plate 70 which is bolted thereto by bolts 71. The hub 65 extends through an opening 72 in the plate 70, but the plate is movable relative thereto in an axial direction. The four corners of the plate each have an air or hydraulic motor 73 bolted thereto by bolts 74 (see FIG. 9). Each motor 73 has a vertically reciprocable output shaft or piston rod 75. Each of the rods 75 bears against the upper surface of the flange 66 of the hub 65. The motors 73 are actuable to move the rods 75 in either direction by the introduction of fluid to the upper or lower ends thereof.

With the mounting plate 67 of the plunger P seated within the slot 68 of the box 69, the motors 73 may be actuated so that their rods will be pressed against the hub flange 66 resulting in the plate 70 being biased upwardly resulting in the box 69 being raised to clamp the upper surface of the plunger plate 67 into tight, sealing engagement with the lower flanged surface of the hub 65. The tight sealing of the surface of plate 67 to the surface of flange 66 is important because cooling water is introduced to the interior of the plunger through a tube or pipe 76 connected to the side of the hub 65. The pipe 76 connects through the interior of the hub to a lower annular chamber 77 formed in the lower face of the hub. A pair of annular sealing rings 78 and 79 confine the water to the surface of the plate 67 where four inlet holes 80 are positioned. The water is circulated into the interior of the plunger and exits through a central hole 81 which matches with a passage 82 in the hub 65. Passage 82 is connected to a pipe 83 for carrying the water away.

In the foregoing manner the face plate plunger is clamped to the press mechanism.

In addition to the clamping of the plunger plate to the hub, there is a locking or latching mechanism which is in the form of four wedge shaped, downwardly extending members 84 formed in the undersurface of top plate 70. These wedges 84 are at equally spaced intervals about the axis of the hub 65. Surrounding the hub 65 and supported on the flange 66 thereof is an annular ring 85. As best illustrated in FIG. 10, the ring 85 has four upstanding wedge shaped members 86 which cooperate with the wedges 84 of the plate 70 when the latching ring 85 is rotated. The ring 85 is shiftable by actuation of a radially outwardly extend arm 87 which extends through an opening 88 in one side of the box 69. The extending end of the arm 87 extends through a yoke 89 that is attached to a piston rod 90. The rod 90 is the output shaft of a reciprocating piston motor 91. The motor 91 is not actuated until the clamping motors 73 have clamped the flange 66 against the plate 67. This will position the plate 70 above the flange at a distance such that the tapered faces of the wedge members 84 and 86 will engage each other and prevent the accidental releasing of the engagement of the flange 66 and plate 67 in the event air pressure to the motors 73 is interrupted. Thus the actuation of the motor 91 will serve to lock or latch the clamp that is applied with the clamping motors 73. Obviously, the sequence of operation of the motors 73 and 91 is important since the clamping action must be in operation for the locking or latching operation to be effective.

As already indicated, the carriage 30 along with the receiver 52, are capable of being raised and lowered by the operation of the motor 38 and such motion is under the control of a limit switch at the plate 34 which may be contacted by an arm 94 on the frame 41.

A second limit switch 95 mounted on the platform 32 has a contact arm that will be contacted by an arm 96 mounted to the box frame 41. In this way the vertical reciprocation of the frame 41 and thus the vertical position of the receiver may be closely controlled by the positions of the switch contacts or arms 94 and 96.

The carriage 30 is horizontally reciprocable on the rods 27 and 28 to bring the receiver 52 into position where its arm 60 will engage a plunger that is to be removed. It should be pointed out that when the receiver is moved into position to receive a plunger on arm 60, the replacement plunger will be carried on the arm 59. This helps balance the load. Once the old plunger is released to the receiver 52, the carriage is retracted out from under the press. A lock pin 97, which extends through aligned holes in the plate 48 and center 59 of the receiver, is removed and the receiver 52 is rotated by grasping the attached handles 92 through 180° and the pin 97 will be reinserted to lock the receiver against rotation. Then the carriage is moved in to place the new plunger in alignment with the press head that will receive the plunger.

To facilitate the operation of the carriage, a limit switch 98 will signal the retracted position. By the same token a limit switch 99 at the forward end of the rods 27 and 28 will signal when the carriage is in its forward position. The carriage 30 may be moved laterally by a motor or by hand.

Figure 2:
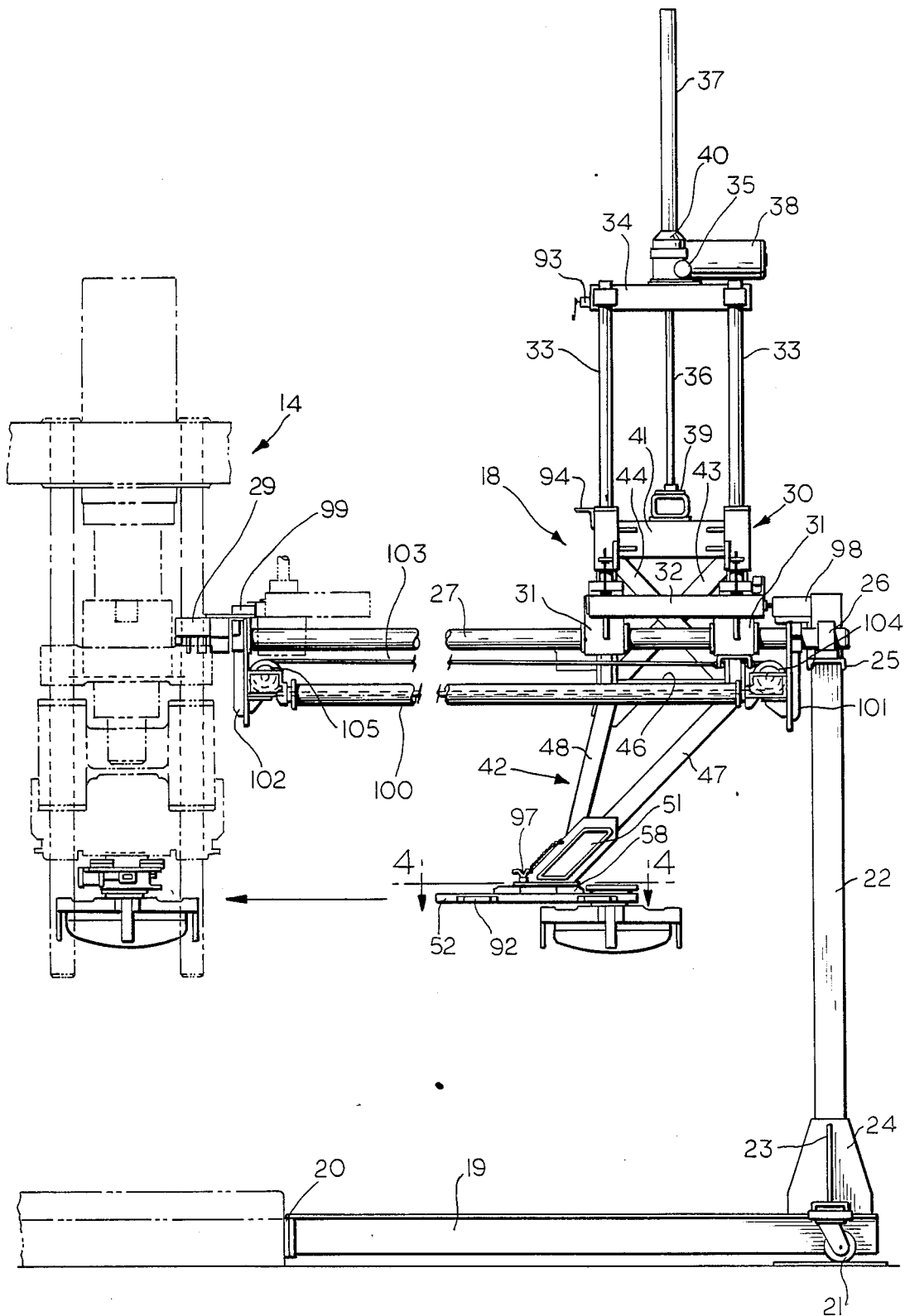
FIG. 2 is a side elevational view of the plunger changing apparatus.
Figure 3:
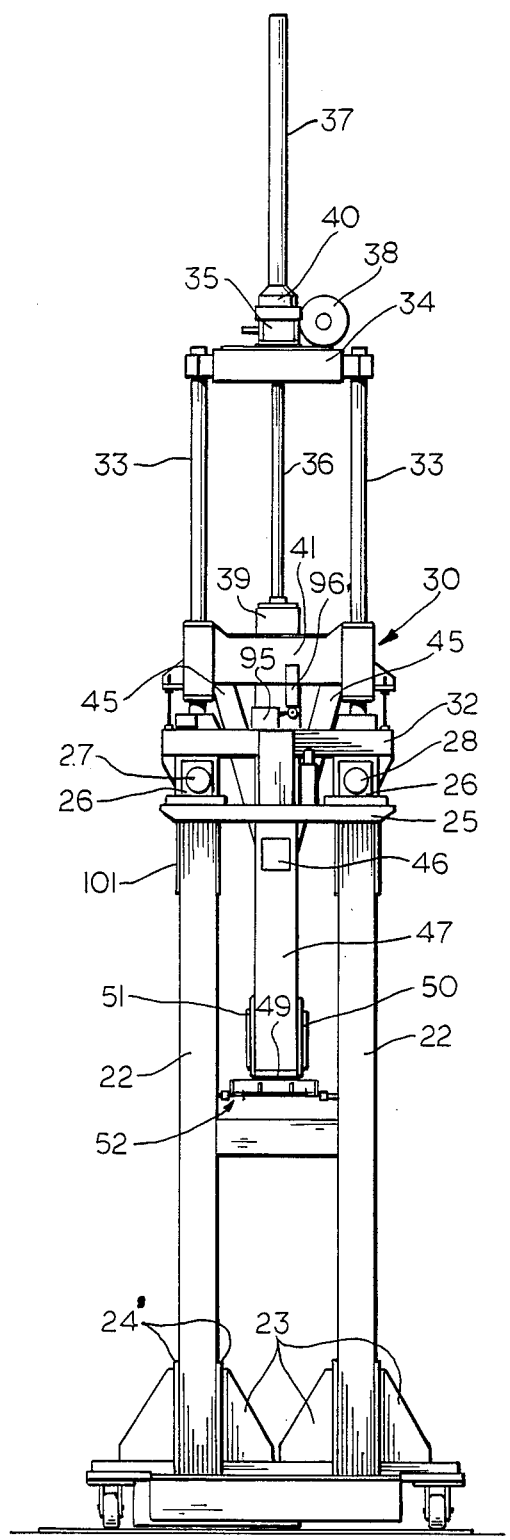
FIG. 3 is an end view of the apparatus of FIG. 2.
Figure 4:
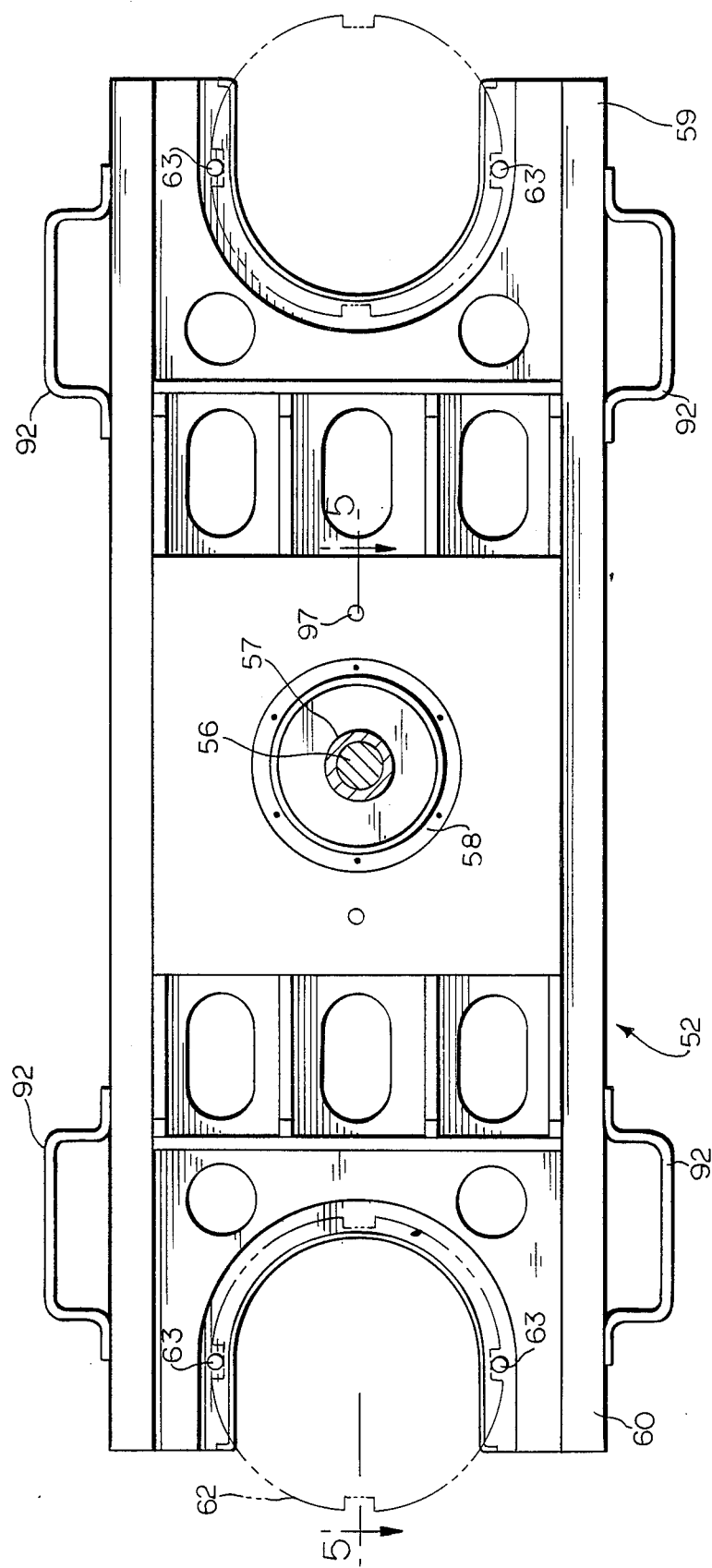
FIG. 4 is an enlarged plan view of the plunger support head of FIG. 2, as viewed from above.
Figure 5:
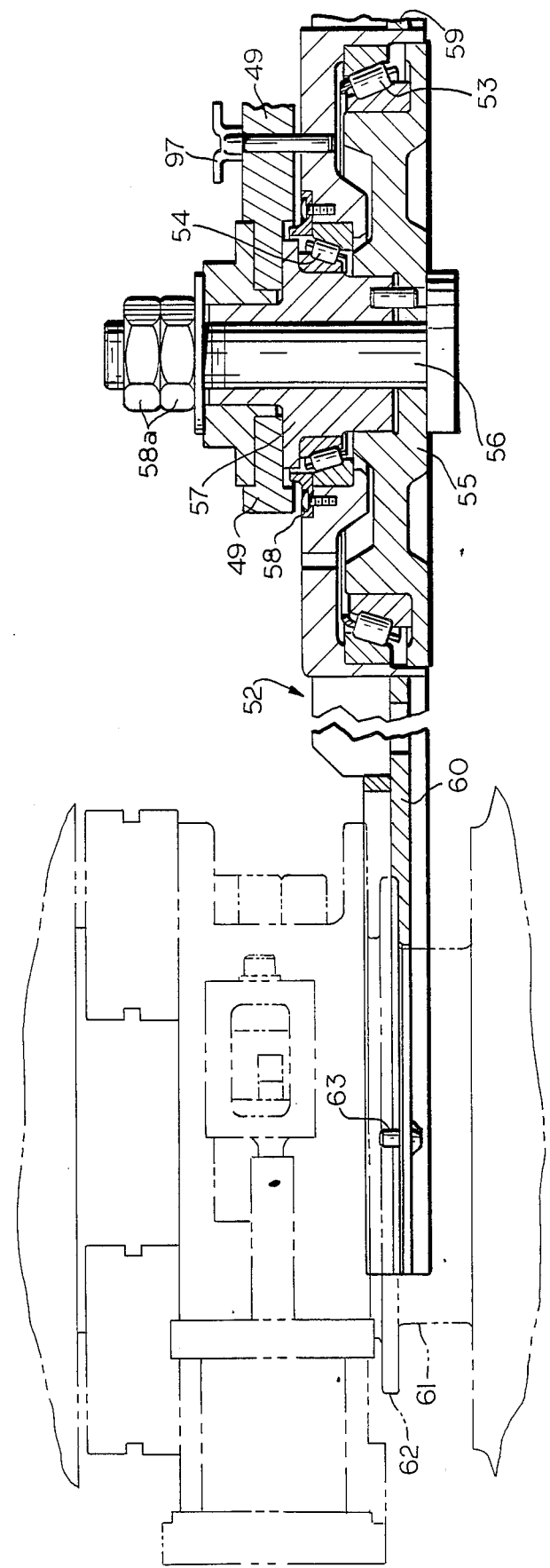
FIG. 5 is an enlarged, cross-sectional view taken at line 5—5 of FIG. 4.
Figure 6:
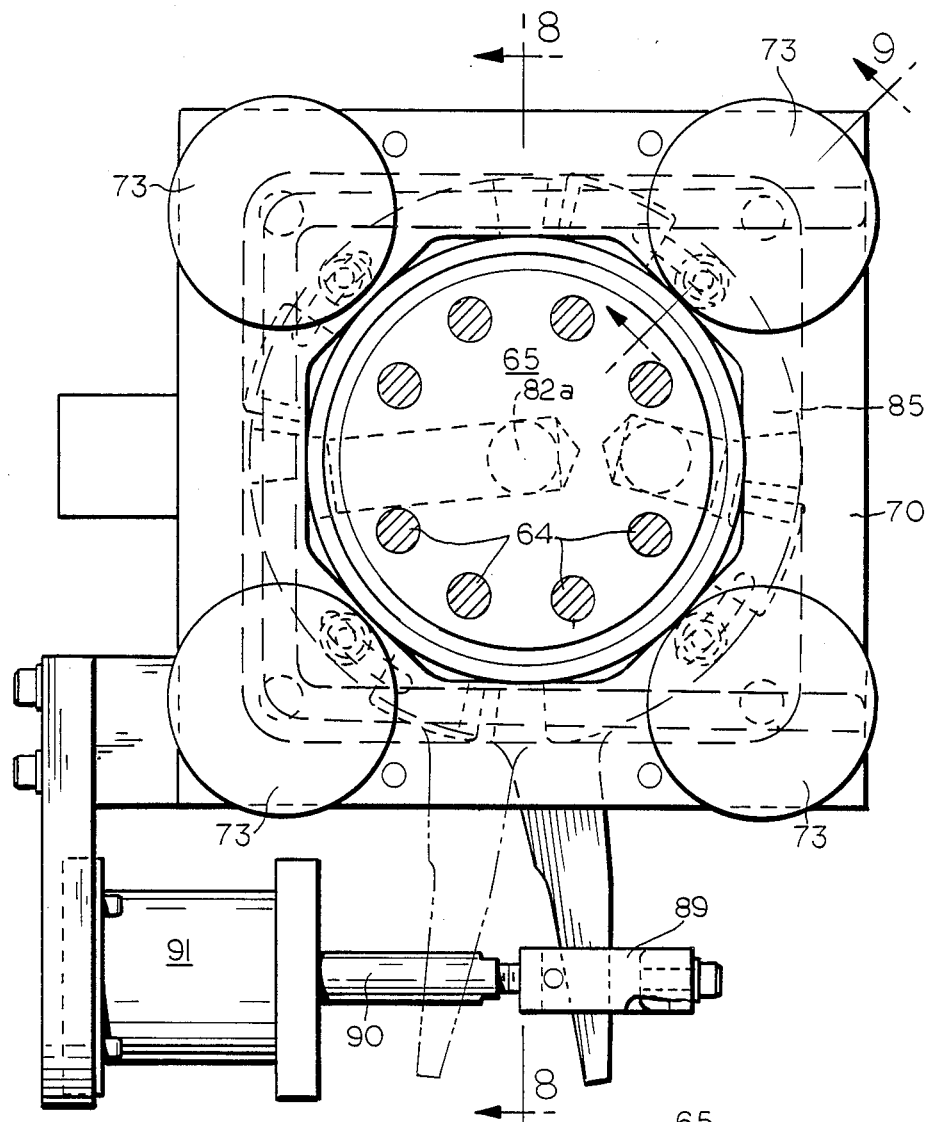
FIG. 6 is a top plan view of the plunger latching and clamping mechanism on the press.
Figure 7:
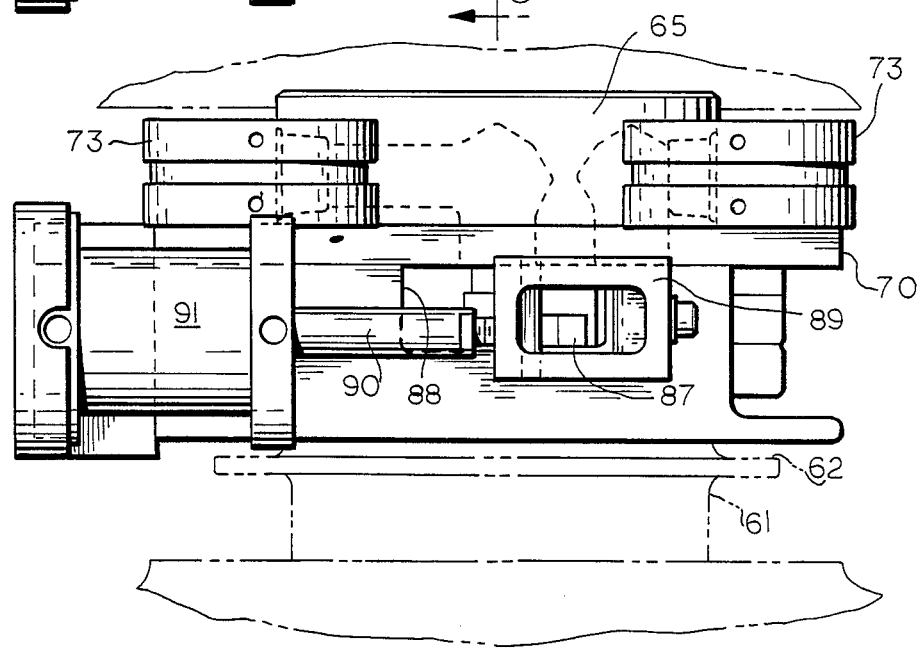
FIG. 7 is a side elevational view of the latching and clamping mechanism of FIG. 6.
Figure 8:
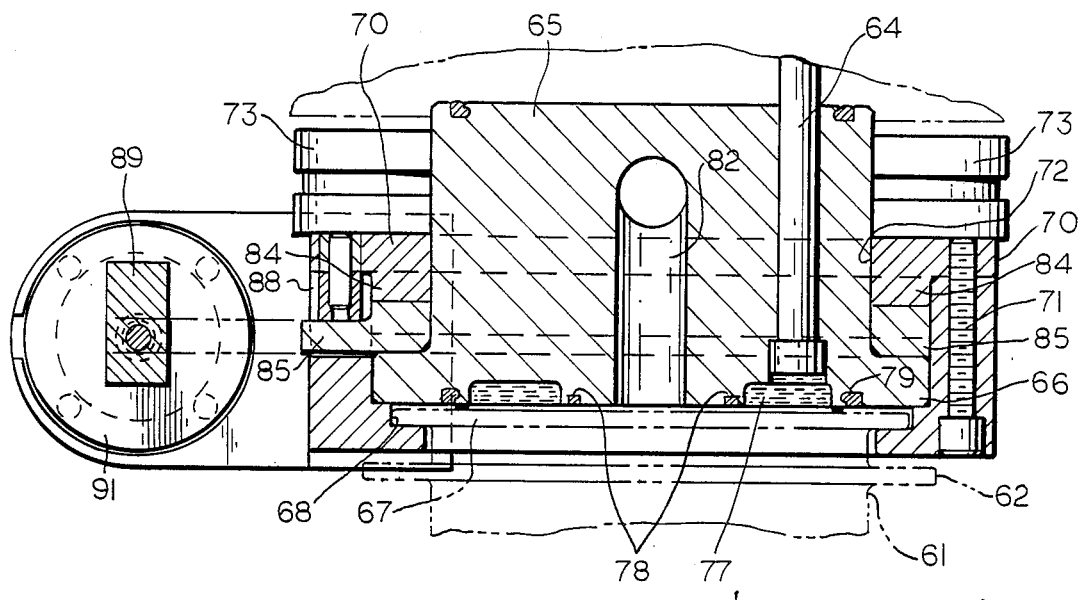
FIG. 8 is a cross-sectional view taken at line 8—8 of FIG. 6.
Figure 9:
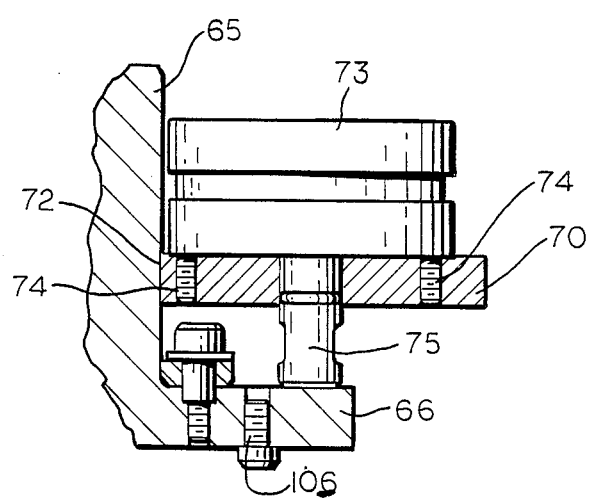
FIG. 9 is a partial sectional view on a slightly enlarged scale taken at line 9—9 of FIG. 6.

As shown in FIG. 2, a horizontal drive tube 100 is mounted between end support plates 101, 102. The tube 100 drives a cable 103 that is threaded over pulleys 104, 105 that are mounted on the plates 101, 102. The cable 103 has its ends connected to the housing of bearing 31. A second tube similar to 100 and its support system is positioned beneath the bearings 31 that are riding on the rod 28.

In view of the foregoing, it can be seen that in the operation of the plunger change equipment described, the following sequence of steps will be performed.

The carriage 30 and attached handler 42 is lowered from its "out" and "up" storage position to the position illustrated in FIG. 2. The new plunger will be placed on the handler 42 and the handler will be in the position shown in FIG. 2 with the locking pin 97 inserted to prevent rotation of the handler.

Once the new plunger is on the handler, a signal will be sent to a cullet chute mechanism to send the cullet chute into gob intercepting position beneath the feeder and at the same time the ram for the press is signalled to move to its top position.

The carriage assembly 30 is moved into position under the ram. When the "in" limit switch 99 is actuated, it is ready to remove the old plunger assembly. The lock cylinder motor 91 is actuated to remove the safety latch from the plunger clamp assembly of FIGS. 6-8. The four air cylinders or motors 73 are shifted, which unclamps the plunger head 67 from the flange 66 of hub 65.

The carriage assembly 30 is then retracted with the old plunger head on the side of the receiver 52 nearest the press 14 and the new plunger on the opposite side. The carriage assembly is retracted until it reaches the end of the cylinder 100 travel and actuates the limit switch 98.

The operator then removes the lock pin 97 from the receiver and rotates it 180° such that the new plunger is now ready for insertion into the press. The lock pin 97 is replaced and the carriage assembly 30 is moved back toward the press 14 until the new plunger is inserted into the box 69 of the plunger clamp assembly and the limit switch 99 is actuated.

The clamp cylinders or motors 73 are then shifted resulting in the new plunger being pulled up into sealing engagement with the flange 66 of the hub 65 of the floating plunger head, sealing the water connections and locating the new plunger at the same time. The latch cylinder or motor 91 is then shifted so that the safety wedges 86 are in place in engagement with the wedges 84 on the plate 70.

The carriage assembly 30 is then retracted until it returns to the position where limit switch 98 is actuated. Once the switch 98 is actuated, the cullet chute is retracted and gobs will then fall into the molds. The press will resume pressing the face plates after the first gob is under the press 14.

The old plunger is then removed from the plunger receiver 52 by removing the lock pin 97 and rotating the receiver until it is in a convenient position. With the old plunger removed, the handler 42 of the carriage 30 is returned to its "up" position by energizing the motor 38 until the "up" limit switch 93 is actuated.

In order to ensure that the plunger plate 67 and the hub flange 66 are in precise alignment as they are brought together by the motors 73, an alignment pin 106 (FIG. 9) extending from the bottom of flange 66 will enter a complimentary hole 107 in the plate 67. As can be seen from FIG. 10, there are actually four holes 107 in the plate 67, one at each corner. Also, there are four pins 106 in the corners of the flange 66.

The foregoing is the sequence of steps involved in operating the semi-automatic plunger change apparatus on the face plate press station of the glass forming machine.

Modifications may be resorted to within the scope of the appended claims.

What is claimed:

1. The method of changing an old plunger for a new plunger on a molten glass forming press of the type where a pressing plunger is moved downward into a mold containing molten glass which is positioned in vertical alignment with the pressing plunger of the press, comprising the steps of positioning a two-plunger supporting means adjacent the press at one side thereof, placing a new plunger on one half of the plunger supporting means, moving the plunger supporting means into position where the other half of the plunger supporting means is in vertical alignment with the old plunger on the press, releasing the old plunger from the press onto the plunger supporting means, moving the plunger supporting means away from the press with both the old and new plunger supported thereby, rotating the plunger supporting means about a vertical axis to exchange the positions of the old and new plungers, moving the plunger supporting means back into alignment with the press where the new plunger is in alignment with the press, attaching the new plunger to the press, moving the plunger supporting means away from the press until the supporting means is clear of the press, and then removing the old plunger from the plunger supporting means.

2. The method of claim 1 including the step of locking the new plunger in attached position.

3. The method of claim 1 further including the step of moving the plunger supporting means into a raised position after removal of the old plunger therefrom.

4. The combination of a molten glass press of the type in which a series of molds are moved into and out of a pressing station where a pressing plunger is vertically reciprocated on a vertical axis of the press toward and away from the mold at the station, and apparatus for changing the plunger on said press, comprising a dual plunger handler, carriage means for supporting the handler for horizontal movement into and out of position adjacent the pressing station on said press, plunger supporting means on said handler for supporting a pair of plungers on opposite sides of a vertical axis, means on said carriage for raising and lowering said handler, horizontal guide means for supporting said carriage, said guide means extending from adjacent the vertical axis of the press to a remote position, means connected to said carriage for reciprocating the carriage on the guide means to move the handler and plunger supporting means in one direction into position to receive the plunger and in the opposite direction for carrying the plunger away from the press to the remote position.

5. The combination of claim 4 further including limit switch means mounted at each end of the guide means responsive to the movement of said carriage to either end of said guide means.

6. The combination of claim 4 further including fluid actuated clamping means on said press for clamping the plunger to the press in sealing engagement.

7. The combination of claim 6 further including means mounted on said press for locking said clamping means to prevent release of the plunger through fluid pressure or electrical failure.

8. The combination of claims 4, 5 or 7 further including handle means attached to said plunger supporting means.

9. The combination of claims 4, 5 or 7 wherein said plunger supporting means is formed with a pair of horizontally extending plunger supporting arms, said arms extending at opposite sides of a central vertical axis.

10. The combination of claim 9 wherein said plunger supporting means is pivotally mounted to said handler at said central vertical axis.

11. The combination of claim 9 further including locking means for said handler for retaining said plunger supporting means in one of two rotative positions relative to said handler.

* * * * *